(12) United States Patent
Yadav et al.

(10) Patent No.: US 11,234,319 B2
(45) Date of Patent: Jan. 25, 2022

(54) BACKUP POWER SOURCE AND CONTROL FOR POWER OVER ETHERNET LIGHT SOURCES

(71) Applicant: Hubbell Incorporated, Shelton, CT (US)

(72) Inventors: Pritam Yadav, Greenville, SC (US); Douglas Matthew Hamilton, Arlington Heights, IL (US)

(73) Assignee: Hubbell Incorporated, Shelton, CT (US)

( * ) Notice: Subject to any disclaimer, the term of this patent is extended or adjusted under 35 U.S.C. 154(b) by 48 days.

(21) Appl. No.: 15/894,209

(22) Filed: Feb. 12, 2018

(65) Prior Publication Data

US 2018/0235055 A1    Aug. 16, 2018

Related U.S. Application Data

(60) Provisional application No. 62/458,800, filed on Feb. 14, 2017.

(51) Int. Cl.
*H05B 47/00* (2020.01)
*H05B 47/185* (2020.01)
(Continued)

(52) U.S. Cl.
CPC .............. *H05B 47/185* (2020.01); *H02J 1/00* (2013.01); *H02J 7/0013* (2013.01); *H02J 9/061* (2013.01); *H04L 12/10* (2013.01); *H04L 12/2838* (2013.01)

(58) Field of Classification Search
CPC ........ H05B 37/00; H05B 33/00; H05B 47/00; H02J 1/00; H02J 7/00; H02J 9/00; H04L 12/00

(Continued)

(56) References Cited

U.S. PATENT DOCUMENTS 6,300,878 B1 * 10/2001 Galloway ............ H05B 39/044
                                                                340/642
9,214,834 B1 * 12/2015 Lunn ...................... H05B 47/18
(Continued)

FOREIGN PATENT DOCUMENTS

CN        201599702 U        10/2010
CN        201774715 U         3/2011
(Continued)

OTHER PUBLICATIONS

PCT International Search Report and Written Opinion for corresponding PCT Application No. PCT/US2018/17792, dated Apr. 25, 2018, 17 pages.

(Continued)

*Primary Examiner* — Hal Kaplan
*Assistant Examiner* — Joseph N Inge
(74) *Attorney, Agent, or Firm* — Michael Best & Friedrich LLP

(57) ABSTRACT

Systems and methods for backup power sources and controls for Power over Ethernet light sources are provided. In one example embodiment, a lighting system includes one or more light sources configured to receive power over one or more Ethernet cables. The lighting system also includes a battery pack comprising an energy storage medium. The battery pack can be configured to provide power to the one or more light sources over one or more Ethernet cables. The lighting system can also include an output control circuit configured to manage delivery of power from the battery pack to the one or more light sources.

20 Claims, 4 Drawing Sheets

(51) Int. Cl.
*H04L 12/10* (2006.01)
*H02J 7/00* (2006.01)
*H04L 12/28* (2006.01)
*H02J 9/06* (2006.01)
*H02J 1/00* (2006.01)

(58) Field of Classification Search
USPC .......................................................... 307/20
See application file for complete search history.

(56) References Cited

U.S. PATENT DOCUMENTS

| | | | |
|---|---|---|---|
| 9,609,706 B2 | 3/2017 | Crenshaw | |
| 2003/0085693 A1* | 5/2003 | Marty | G05F 1/573 |
| | | | 323/280 |
| 2008/0197790 A1* | 8/2008 | Mangiaracina | F21V 23/04 |
| | | | 315/312 |
| 2008/0290729 A1* | 11/2008 | Schoenberg | H04B 3/44 |
| | | | 307/3 |
| 2010/0253266 A1* | 10/2010 | Jeung | H02P 6/20 |
| | | | 318/400.26 |
| 2012/0025709 A1 | 2/2012 | Zampini et al. | |
| 2012/0262093 A1* | 10/2012 | Recker | H02J 7/0068 |
| | | | 315/308 |
| 2012/0271477 A1* | 10/2012 | Okubo | H04L 12/10 |
| | | | 700/297 |
| 2013/0169050 A1 | 7/2013 | Tseng | |
| 2014/0125252 A1 | 5/2014 | Wu | |
| 2015/0237689 A1* | 8/2015 | Yang | H05B 45/50 |
| | | | 315/200 R |
| 2016/0036268 A1* | 2/2016 | Laherty | H05B 45/30 |
| | | | 307/19 |
| 2016/0064938 A1 | 3/2016 | Balasubramanian et al. | |
| 2016/0273722 A1* | 9/2016 | Crenshaw | H05B 45/3725 |
| 2018/0027630 A1* | 1/2018 | DeJonge | H02J 9/061 |
| | | | 315/86 |

FOREIGN PATENT DOCUMENTS

| | | |
|---|---|---|
| CN | 102056379 A | 5/2011 |
| EP | 2701338 | 2/2014 |
| WO | 2016149549 A1 | 9/2016 |
| WO | WO2017108372 | 6/2017 |

OTHER PUBLICATIONS

PCT International Preliminary Report on Patentability for corresponding PCT Application No. PCT/US2018/17792, dated Aug. 20, 2019, 15 pages.
EP 18754329 Extended European Search Report and Search Opinion dated Oct. 19, 2020.
Chinese Patent Application No. 2018800169410 First Office Action issued by the China National Intellectual Property Administration dated Mar. 1, 2021 (and translation).

* cited by examiner

US 11,234,319 B2

BACKUP POWER SOURCE AND CONTROL FOR POWER OVER ETHERNET LIGHT SOURCES

PRIORITY CLAIM

The present application claims the benefit of priority of U.S. Provisional Patent Application Ser. No. 62/458,800, titled "Backup Power Source and Control for Power Over Ethernet Light Sources," filed Feb. 14, 2017, which is incorporated herein by reference.

FIELD

The present subject matter relates generally to lighting systems.

BACKGROUND

Power over Ethernet ("PoE") technology has allowed for light sources, such as LED luminaires, to be used in a variety of lighting applications. In a typical PoE application, Power Sourcing Equipment ("PSE"), such as a PoE switch, can provide a low voltage DC power output over Ethernet cables to power the light sources. The PSE can be powered by an AC power input and further be configured to control the light sources through a control system, such as a computer-based lighting control system. Thus, a PoE lighting system can provide for a low voltage lighting solution in a variety of environments, such as in an office building, which can be controlled by a centralized control system.

However, in an emergency situation, such as during a power outage, the AC power to the PSE may be interrupted. In such a situation, the unpowered PSE will be unable to provide DC power to the light sources in the lighting system, causing a potentially unsafe environment for any occupants in the unilluminated area. Further, the lack of lighting along egress routes, such as in emergency stairwells, can greatly increase the likelihood of injury for an occupant attempting to exit the building. Moreover, the lack of illumination can hinder the ability of first responders to provide emergency services to any occupants who may remain in the building.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a lighting system. A lighting system can include one or more light sources configured to receive power over one or more Ethernet cables. The lighting system can also include a battery pack comprising an energy storage medium. The battery pack can be configured to provide power to the one or more light sources over one or more Ethernet cables. The lighting system can also include an output control circuit configured to manage delivery of power from the battery pack to the one or more light sources.

Other example aspects of the present disclosure are directed to systems, methods, devices, circuits and apparatus for providing backup power to PoE light sources.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION

Detailed discussion of embodiments directed to one of ordinary skill in the art are set forth in the specification, which makes reference to the appended figures, in which.

DETAILED DESCRIPTION

Figure 1:
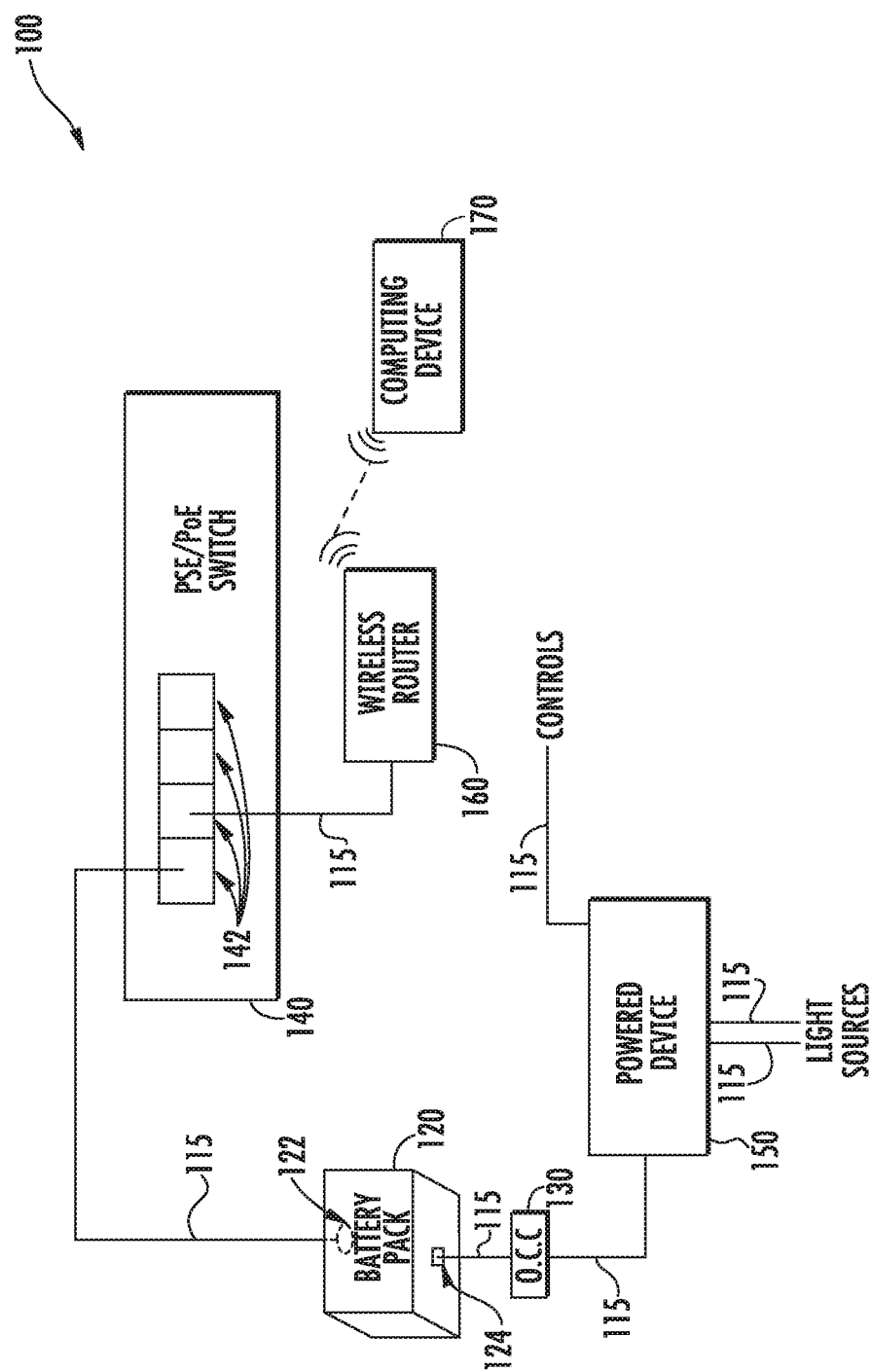
FIG. 1 depicts an overview of an example lighting system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems, devices, and methods for providing backup power to light sources over Ethernet cables. A lighting system can include, for example, one or more light sources configured to receive power over one or more Ethernet cables. The light sources can be, for example, LED luminaires or other light sources. The lighting system can further include a battery pack, which can include an energy storage medium. For example, a battery pack can include one or more battery cells, which can store electrical power. The battery pack can be configured to provide power to the one or more light sources over one or more Ethernet cables. The lighting system can further include an output control circuit configured to manage delivery of power from the battery pack to the one or more light sources. For example, the output control circuit could be a voltage or current control circuit configured to manage the output voltage or current from the battery pack.

The battery pack and the control circuit can be used in a variety of configurations. For example, a power system can include a PSE and a powered device ("PD"). During normal operation, the PSE can receive an AC power input and provide a DC power output to one or more coupled devices, such as one or more light sources, battery packs, or PDs connected to the PSE by one or more Ethernet cables. The PSE can further be connected to a control system, such as a web-based or computer-based control system, which can control operation of the one or more light sources in the lighting system. Additionally, a PSE can be configured to transfer data to one or more coupled devices over one or more Ethernet cables. For example, a PSE can send one or more commands to a PD, which can be connected to one or more light sources via one or more Ethernet cables. The PD can turn the light sources on or off based on the power and commands from the PSE and/or local controls. In various embodiments, the battery pack can be integrated into the PSE, integrated into the PD, or can be a stand-alone battery pack. Further, the output control circuit can be integrated into the battery pack, integrated into a light source, or can be a stand-alone output control circuit. In a stand-alone configuration, the battery pack can be coupled between a PSE and a PD, or between a PD and a light source. Further, the battery pack can be configured to receive power from either a PSE or PD via an input cable, and can provide power, such as emergency backup power, via an output cable.

The lighting system can be configured to deliver power to the one or more light sources when power is not being provided by another power source, such as a PSE. For example, the battery pack can include a power detection circuit configured to determine whether power is being provided by another source, such as a PSE or PD located upstream of the battery pack. Additionally, when power is not being provided by an upstream device, the power detection circuit can be configured to control the battery pack to operate in a battery mode to provide power to one or more light sources. For example, power detection circuit can be configured to detect when a power outage occurs, and when a power outage has occurred, the power detection circuit can be configured to control the battery pack into a battery mode to provide power to one or more light sources. When power is being provided by an upstream device, such as a PSE or PD, the power detection circuit can be configured to recharge the battery pack to allow for emergency power to be available during a future power outage.

The output control circuit can be configured to manage delivery of power from the battery pack to the one or more light sources in a variety of ways. For example, the output control circuit can be a voltage control circuit configured to control an output voltage of power provided to the light source. For example, a voltage control circuit can include a first selectable resistor and a second selectable resistor connected in series. The first selectable resistor and the second selectable resistor can be coupled between a first terminal and a second terminal of an output from the battery pack either by directly connecting the voltage control circuit to the battery pack or by connecting it via one or more Ethernet cables. The output voltage for the voltage control circuit can be, for example, a voltage across the second selectable resistor. For example, one or more light sources can be connected in parallel with the second selectable resistor in order to control the voltage provided to the one or more light sources.

In another embodiment, the output control circuit can be a current control circuit configured to control an output current provided to a light source. For example, a constant current regulator can be configured to provide a controlled current to a light source. In another embodiment, a selectable resistor can be configured to provide a controlled current to a light source.

In another embodiment, the output control circuit can include a microcontroller configured to control delivery of power from the battery pack to a light source. Further, the microcontroller can be configured to control delivery of power to a plurality of light sources, such as a first light source and a second light source, and further can be configured to control the power delivered to the first light source independently of the power provided to the second light source. For example, a microcontroller can be configured to provide a first power, such as a low-voltage power to one or more LED luminaires, and can be configured to provide a second power to one or more emergency light sources, such as one or more egress pathway lights.

Further, the output control circuit can include a feedback circuit configured to determine a load power consumption requirement for the one or more light sources. For example, a feedback control circuit can be configured to determine the power needs for one or more light sources being provided power by the battery pack, such as by measuring a voltage, current, and/or power consumption for each connected light source. Additionally, the feedback circuit can be configured to control a power delivered by the battery pack based at least in part on the load power consumption requirement. For example, the power delivered to the light sources can be controlled to ensure that the battery pack has sufficient power reserves to provide power to the light sources for a threshold time period. In this way, an output control circuit can be configured to manage delivery of power to one or more light sources such that the operational life of the battery pack can exceed a threshold time period. Further, in this way, a battery pack can be configured to provide power to one or more light sources to provide egress lighting for a threshold time period.

In one or more embodiments, the battery pack can further be configured to be controlled to provide power to one or more light sources according to one or more commands from a local control device. For example, a local control device, such as a sensor or switch, can be connected to a PD. The battery pack can be configured to provide power to the PD, which can use the one or more commands from the local control device to control whether power is provided to one or more light sources connected to the PD.

The systems, devices, and methods according to example aspects of the present disclosure can thus allow for emergency backup power to be provided to one or more light sources in a PoE lighting system. This can increase the safety for occupants of a building utilizing a PoE lighting system by reducing the likelihood of injuries, while further ensuring that certain applicable regulatory standards are met by the PoE lighting system.

One example embodiment of the present disclosure is directed to a lighting system. The lighting system includes one or more light sources configured to receive power over one or more Ethernet cables. The lighting system can include a battery pack having an energy storage medium. The battery pack can be configured to provide power to the one or more light sources over the one or more Ethernet cables. The lighting system can include an output control circuit configured to manage delivery of power from the battery pack to the one or more light sources.

Variations and modifications can be made to this example embodiment. For instance, the output control circuit can include a voltage control circuit configured to control an output voltage of power provided to the light source. In some embodiments, the voltage control circuit includes a first selectable resistor and a second selectable resistor connected in series. The output voltage for the voltage control circuit can include a voltage across the second selectable resistor.

In some embodiments, the output control circuit can include a current control circuit configured to control an output current provided to the light source. The current control circuit can include, for instance, a constant current regulator configured to provide a controlled current to the light source. In some embodiments, the current control circuit can include a selectable resistor configured to provide a controlled current to the light source.

In some embodiments, the output control circuit can include a microcontroller configured to control delivery of power to the light source. The microcontroller can be configured to control delivery of power to a first light source independently of a second light source.

In some embodiments, the output control circuit can include a feedback circuit. The feedback circuit can be configured to determine a load power consumption requirement for the one or more light sources. The feedback circuit can be configured to control a power delivered by the battery pack based at least in part on the load power consumption requirement.

In some embodiments, the battery pack is configured to receive power over at least one upstream Ethernet cable. The battery pack can include a power detection circuit configured to determine whether power is being provided over the at least one upstream Ethernet cable. When power is not being provided over the at least one upstream Ethernet cable, the power detection circuit can be configured to control the battery pack to operate in a battery mode to provide power to a downstream light source. For instance, the battery pack can be configured to be controlled to provide power to the one or more light sources by a local control device when power is not being provided over the at least one upstream Ethernet cable.

In some embodiments, the system can include a powered device configured to provide power to one or more light sources. The powered device can be configured to receive one or more control signals from a local control device. The local control device can be a switch or a sensor. In some embodiments, the battery pack can be integrated into the powered device. In some embodiments, the battery pack can be integrated between the powered device and the one or more light sources.

In some embodiments, the output control circuit is integrated into the battery pack. In some embodiments, the output control circuit is integrated into one of the one or more light sources. In some embodiments, the output control circuit is a stand alone output control circuit coupled between the battery pack and one of the one or more light sources.

In some embodiments, the output control circuit is configured to deliver power to the one or more light sources when power is not being provided by a power sourcing equipment or a powered device. In some embodiments, the one or more light sources include one or more LED luminaires. In some embodiments, the battery pack is configured to provide power to the one or more light sources such that the operational life of the battery pack exceeds a threshold time period. In some embodiments, the battery pack is configured to provide power to the one or more light sources to provide egress lighting for a threshold time period.

In some embodiments, the lighting system can include a power source equipment configured to receive AC power and provide DC power over the one or more Ethernet cables to one or more coupled devices. The power sourcing equipment can be configured to transfer data to one or more coupled device of the one or more Ethernet cables. The battery pack can be integrated into the power sourcing equipment.

Another example embodiment of the present disclosure is directed to a battery pack apparatus for providing power to a light source. The apparatus includes an energy storage medium. The apparatus includes an output configured to receive a first Ethernet cable. The apparatus includes an input configured to receive a second Ethernet cable. The input can be configured to receive power from an external power source over the second Ethernet cable received in to the input. The energy storage medium can be configured to store power received by the input. The output can be configured to provide power stored in the energy storage medium over the second Ethernet cable.

Variations and modifications can be made to this example embodiment of the present disclosure. For instance, in some embodiments, the apparatus can include an output control circuit configured to control delivery of power from the energy storage medium. The output control circuit can include a voltage control circuit configured to control an output voltage of power provided to a light source. The voltage control circuit can include a first selectable resistor and a second selectable resistor connected in series. The output voltage for the voltage control circuit can include a voltage across the second selectable resistor.

In some embodiments, the output control circuit can include a current control circuit configure to control an output current provided to a light source. In some embodiments, the current control circuit can include a constant current regulator configured to provide a controlled current to the light source. In some embodiments, the current control circuit includes a selectable resistor configured to provide a controlled current to the light source. In some embodiments, the output control circuit includes a microcontroller configured to control delivery of power to the light source.

In some embodiments, the output control circuit can include a feedback circuit. The feedback circuit can be configured to determine a load power consumption requirement for the one or more light sources. The feedback circuit can be configured to control a power delivered by the battery pack based at least in part on the load power consumption requirement.

In some embodiments, the battery pack can include a power detection circuit configured to determine whether power is being provided over the second Ethernet cable. When power is not being provided over the second Ethernet cable, the power detection circuit can be configured to control the battery pack to operate in a battery mode to provide power to a downstream light source. For instance, the battery pack can be configured to be controlled to provide power to the one or more light sources by a local control device when power is not being provided over the second Ethernet cable.

Yet another example embodiment of the present disclosure is directed to a method for providing backup power from a battery pack apparatus to a light source configured to receive power over one or more Ethernet cables. The method can include: receiving, by a battery pack apparatus, one or more signals indicative of a power outage conditioning power from battery pack by an output control circuit to generate a managed power; and providing the managed power to the light source.

Variations and modifications can be made to this example embodiment of the present disclosure. For instance, receiving, by a battery pack apparatus, one or more signals indicative of a power outage can include receiving one or more signals by a power detection circuit in the battery pack apparatus. The one or more signals indicative of the power outage can include a zero current and/or a zero voltage signal.

In some embodiments, conditioning power from the battery pack by an output control circuit to generate a managed power can include providing power from an energy storage medium in the battery pack to an output control circuit. In some embodiments, the method can include operating the battery pack in a battery mode.

In some embodiments, providing, by an output control circuit, a managed power from the battery pack can include controlling an output voltage by a voltage control circuit. In some embodiments, providing, by an output control circuit, a managed power from a battery pack can include controlling an output current by a current control circuit. In some embodiments, providing, by an output control circuit, a managed power from the battery pack can include controlling a power output by a microcontroller.

In some embodiments the method can include determining a load power consumption requirement. The load power consumption requirement can be determined by a feedback circuit. The method can include controlling a power delivered by the battery pack based at least in part on the load power consumption requirement.

In some embodiments, providing, by an output control circuit, a managed power from a battery pack can include providing, by an output control circuit, a managed power from a battery pack such that the operational life of the battery pack exceeds a threshold time period.

Referring now to FIG. 1, a lighting system 100 according to example aspects of the present disclosure is depicted. As depicted, a lighting system 100 can include one or more light sources. For example, as depicted, the lighting system 100 can include a plurality of light sources. Each light source can be, for example, an LED luminaire configured to receive power via one or more Ethernet cables 115. Each Ethernet cable 115 can be, for example, a cat 5/6 Ethernet cable. One of ordinary skill in the art will recognize that an Ethernet cable 115 can be any Ethernet cable configured to provide power to one or more light sources.

The lighting system 100 can further include a battery pack 120 and an output control circuit ("OCC") 130. The battery pack 120 can include an input 122 (depicted in phantom) configured to receive an Ethernet cable 115 and an output 124 configured to receive an Ethernet cable 115. The input 122 can be configured to receive power from an external power source over an Ethernet cable 115 received into the input 122. The battery pack 120 can further include an energy storage medium (not shown), such as one or more batteries. The energy storage medium can be, for example, lithium-ion batteries, sodium-ion batteries, Nickel-based batteries, rechargeable alkaline batteries, or other suitable batteries. The energy storage medium can be configured to store power received by the input 122. The output 124 can be configured to provide power stored in the energy storage medium over an Ethernet cable 115 received into the output 124. For example, power received from an upstream power source can be received by the input 122 and stored in the energy storage medium. The power stored in the energy storage medium can then be provided to a downstream device by an Ethernet cable 115 plugged into the output 124. As used herein, the term "upstream" refers to any device connected on the input side of a battery pack 120. As used herein, the term "downstream" refers to any device connected on the output side of a battery pack 120. For example, as depicted in FIG. 1, a PSE/PoE Switch 140 is located upstream of a battery pack 120 and a PD 150 is located downstream of battery pack 120.

The battery pack 120 can be configured in a variety of locations in a lighting system 100. For example, as depicted in FIG. 1, a battery pack 120 can be coupled between a PSE 140 and a PD 150. In such a configuration, the battery pack 120 can be configured to receive power from the PSE 140, and further can be configured to provide power to the PD 150 located downstream of the battery pack 120. Further, in such a configuration, the battery pack 120 can provide power to the PD 150 in order to allow the PD 150 to power one or more light sources coupled to the PD 150. Further, in an embodiment, one or more local control devices, such as one or more sensors or switches, can be configured to control delivery of power from the battery pack 120 to one or more light sources by, for example, controlling the PD 150 to turn the light sources to an off state or an on state.

In another configuration not depicted in FIG. 1, the battery pack 120 can be coupled between a PD 150 and one or more light sources. In such a configuration, the battery pack 120 can be configured to provide power to one or more light sources connected directly to the battery pack 120 by an Ethernet cable 115.

The battery pack 120 can also include a power detection circuit configured to determine whether power is being provided over an upstream Ethernet cable. For example, a power detection circuit can be an intelligent circuit that detects whether power is being provided by an upstream power source, such as a PSE 140. When power is not being provided to the battery pack by an upstream power source, the power detection circuit can further be configured to control the battery pack 120 to operate in a battery mode to provide power to one or more downstream devices. For example, the power detection circuit can be configured to detect that a power outage has occurred when power is no longer being provided by an upstream power source, and further can be configured to control the battery pack 120 into a battery mode to provide power to a PD 150 or light source located downstream of the battery pack 120. The power detection circuit can be, for example, configured to detect either a zero voltage or zero current in an Ethernet cable 115 connected to the input 122.

Further, when in the battery mode, the battery pack 120 can be controlled by a local control device to provide power to one or more light sources, such as by a sensor or a switch. For example, as noted above, the battery pack 120 can be in a battery mode and can provide power to a PD 150 located downstream of the battery pack 120, and a local control device connected to the PD 150, such as a sensor or a switch, can be configured to control one or more light sources also connected to the PD 150. In this way, the battery pack can be configured to be controlled to provide power to one or more light sources by a local control device when power is not being provided by an upstream device, such as a PSE 140.

The OCC 130 can be configured to condition power from the battery pack 120 to generate a managed power to be provided to the one or more light sources. For example, in various embodiments, the OCC 130 can be configured to control an output voltage, an output current, or both to manage the power delivered by the battery pack 120 to the light sources. The OCC 130 can be configured to control the power dissipation of a battery pack 120 in accordance with either a minimal power required by a light source for a period of time to meet an applicable standard, or the OCC 130 can control a power delivered to a light source based on the specific type and/or load consumption requirements of the light source.

In an embodiment, the OCC 130 can be integrated into the battery pack 120. For example, the battery pack 120 can be a standalone unit configured to be coupled between an upstream power source and a downstream light source. The OCC 130 can be integrated into the battery pack such that the power delivered by the battery pack 120 via the output 124 of the battery pack is managed by the OCC 130.

In another embodiment, the OCC 130 can be a standalone unit, which can include an input and an output configured to receive Ethernet cables 115. For example, a user may desire to replace a first OCC 130, such as a voltage control circuit, with a second OCC 130, such as a current control circuit. In a stand-alone configuration, the OCC 130 can be replaced by unplugging the first OCC 130 and replacing it with a second OCC 130.

In yet another embodiment, the OCC 130 can be integrated into a light source. For example, a light source can include a printed circuit board ("PCB") containing one or more LEDs. The OCC 130 can be included directly on the LED PCB inside the light source. An advantage provided by this configuration is that the OCC 130 can be adjusted based on the type of light source. This can help to minimize the bill of materials costs associated with light sources in a lighting system 100.

The OCC 130 can also include a feedback circuit configured to determine a load power consumption requirement for one or more light sources. For example, a stand-alone OCC 130 or an OCC 130 integrated into a battery pack 120 can be configured to determine a power load consumption requirement for all downstream light sources or other devices by using a feedback circuit configured to measure one or more voltages, currents, or power loads for the downstream devices. Similarly, an OCC 130 integrated into a light source can be configured to determine the power load consumption requirements for an individual light source. In an embodiment, a feedback circuit can include a microcontroller or other control device which can be configured to determine the load consumption requirements for one or more downstream light sources. For example, a control device can be programmed with the load power consumption requirements or ranges of load power consumption requirements for one or more downstream light sources.

Further, the feedback circuit in an OCC 130 can be configured to control a power delivered by the battery pack 120 based at least in part on the load power consumption requirement. For example, a feedback circuit can determine a total power load consumption requirement for all downstream light sources at a first voltage, current, or power level. The feedback circuit can further be configured to adjust the amount of power provided to one or more downstream light sources by, for example, adjusting a voltage, current, or power level provided to an adjustable light source in order to manage the power reserves of the battery pack 120. In this way, an OCC 130 can be configured to manage delivery of power to one or more light sources such that the operational life of the battery pack 120 can exceed a threshold time period. Further, the OCC 130 can be configured to deliver power to one or more light sources when power is not being provided by a PSE 140 or a PD 150. Further, an OCC 130 can allow a battery pack 120 to be configured to provide power to one or more light sources to provide egress lighting for a threshold time period, such as for a specified time period according to applicable regulatory standards during a power outage.

Referring still to FIG. 1, the PSE 140 can be configured to receive an AC power input and provide a DC power output via one or more PoE ports 142. Each PoE port 142 can be configured to provide power via one or more Ethernet cables 115. Further, each PoE port can be configured to transfer data via one or more Ethernet cables 115. For example, the PSE 140 can be configured to send one or more signals, such as one or more command signals, over one or more Ethernet cables 115 to control and provide power to one or more light sources in the lighting system 100.

In an embodiment, a battery pack 120 and OCC 130 can be integrated into a PSE 140. In such a configuration, the battery pack 120 and OCC 130 can be configured to provide a managed power to one or more devices connected to one or more PoE ports 142 of the PSE 140 by an Ethernet cable 115.

The PSE 140 can be further configured to receive data from a data source, such as a wireless router 160. For example, wireless router 160 can be configured to communicate with one or more web-based control systems or computing devices 170. For example, a web-based control system can be operated on a computing device 170, which can communicate with a wireless router 160 connected by an Ethernet cable 115 into a PoE port 142 of the PSE 140. In one or more additional and/or alternative embodiments not depicted in FIG. 1, a computing device 170 can be configured to communicate with a wireless router 160 or a PSE 140 by one or more communication cables, such as one or more Ethernet cables 115. The control system operating on a computing device 170 can be, for example, a control system configured to control operation of one or more light sources in the lighting system 100. For example, the control system operated on a computing device 170 can provide scheduling commands configured to automatically power one or more light sources according to a scheduled pattern. Further, a control system operating on a computing device 170 can be configured to provide one or more syncing commands with one or more control devices in the lighting system 100 such that the control devices can be used as local control devices for controlling one or more light sources. For example, the control devices can be one or more sensors or switches, which can be configured to control one or more light sources locally. The sensors can be, for example, motion sensors or other sensors configured to detect the presence of a person. The switches can be, for example, one or more wall switches configured to control one or more light sources in a specific location.

The light system 100 can further include a PD 150. The PD 150, also known as a PoE node and/or PoE driver, can be configured to negotiate power with one or more light sources and one or more local control devices, such as one or more sensors and switches. For example, a PD 150 can be configured to allow one or more sensors or switches to be used to control one or more light sources. The control devices can be coupled to the PD 150 via one or more Ethernet cables 115. Similarly, the light sources can also be coupled to the PD 150 by one or more Ethernet cables 115. The PD 150 can be configured to provide data and/or power to the light sources by the Ethernet cables 115.

In an embodiment, a battery pack 120 and OCC 130 can be integrated into a PD 150. In such a configuration, the battery pack 120 and OCC 130 can be configured to provide a managed power to one or more devices connected to the PD 150 by an Ethernet cable 115.

Figure 2:
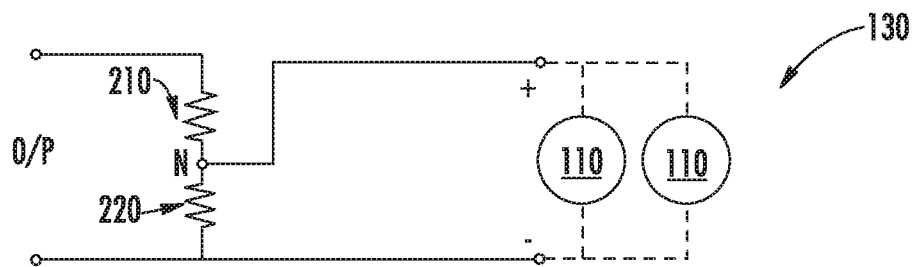
FIG. 2 depicts an example output control circuit according to example embodiments of the present disclosure.

Referring now to FIG. 2, an OCC 130 according to example aspects of the present disclosure is depicted. The OCC 130 can be a voltage control circuit configured to control an output voltage of power provided to one or more light sources 110. For example, as shown, an OCC 130 can include a first selectable resistor 210 and a second selectable resistor 220 connected in series across the terminals of an output 124 from the battery pack 120 ("O/P"). The output 124 can be, for example, an output across the energy storage medium, such as in a configuration in which the OCC 130 is integrated into the battery pack 120, or it can be an output from an Ethernet cable 115 connected to the output 124 of the battery pack 120, such as in a stand-alone OCC 130 configuration.

The first selectable resistor 210 and the second selectable resistor 220 can be, for example, resistors with variable resistance, or they can be resistors with a specific resistance selected to provide a particular voltage output. The first selectable resistor 210 and the second selectable resistor 220 can together define a node "N" between them. One or more light sources 110 can be connected between the node N and a second terminal of an output such that the light sources are connected in parallel with the second selectable resistor 220, thereby allowing the voltage across the second selectable resistor 220 to be the same voltage provided to the one or more light sources 110. For example, as depicted in FIG. 2, two light sources 110 can be connected in parallel with the second selectable resistor 220. In this way, the voltage provided by the output 124 of the battery pack 120 to the one or more light sources 110 can be controlled by the OCC 130, and the output voltage provided to the light sources 110 can be the voltage across the second selectable resistor 220.

Figure 3:
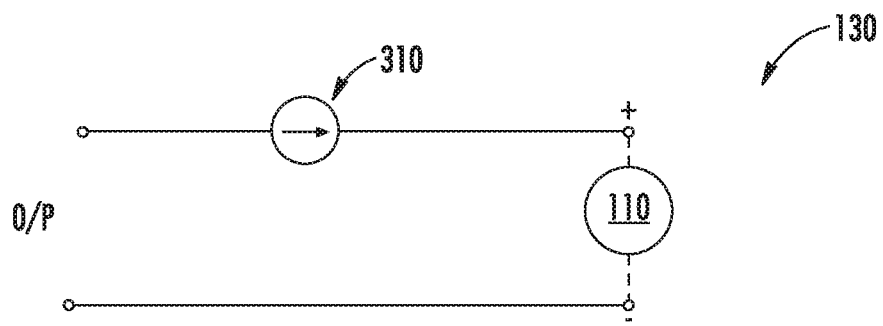
FIG. 3 depicts an example output control circuit according to example embodiments of the present disclosure.

Referring now to FIG. 3, an OCC 130 according to example aspects of the present disclosure is depicted. The OCC 130 can be a current control circuit configured to control an output current provided to one or more light sources 110. For example, as shown, an OCC 130 can include a current controller 310 configured to control the current provided by the output terminals of an output 124 from the battery pack 120 ("O/P"). The output 124 can be, for example, an output across the energy storage medium, such as in a configuration in which the OCC 130 is integrated into the battery pack 120, or it can be an output from an Ethernet cable 115 connected to the output 124 of the battery pack 120, such as in a stand-alone OCC 130 configuration.

Figure 4:
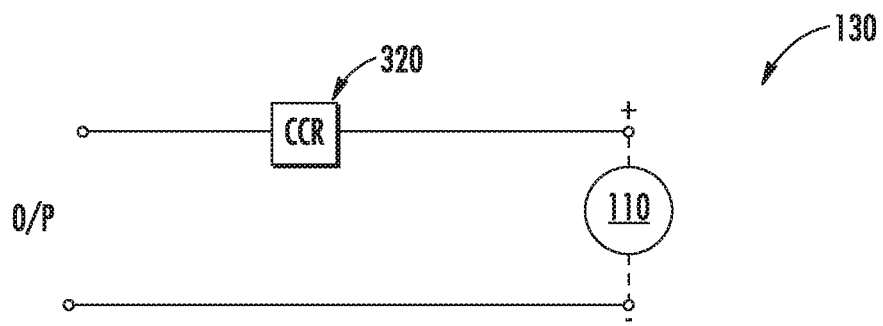
FIG. 4 depicts an example output control circuit according to example embodiments of the present disclosure.
Figure 5:
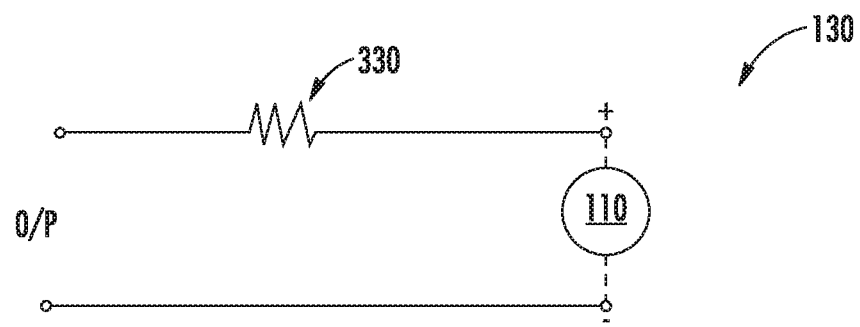
FIG. 5 depicts an example output control circuit according to example embodiments of the present disclosure.

The current controller 310 can control the current provided to a light source 110. For example, referring to FIG. 4, the current controller 310 can be a constant current regulator 320, such as a linear constant current regulator configured to regulate a current over a voltage range. In another embodiment depicted in FIG. 5, the current controller 310 can be a selectable resistor 330. The selectable resistor 330 can be a resistor with a variable resistance, or it can be resistor with a specific resistance selected to provide a desired current based on the voltage provided by the output 124 and the particular light source 110 connected to the OCC 130.

Figure 6:
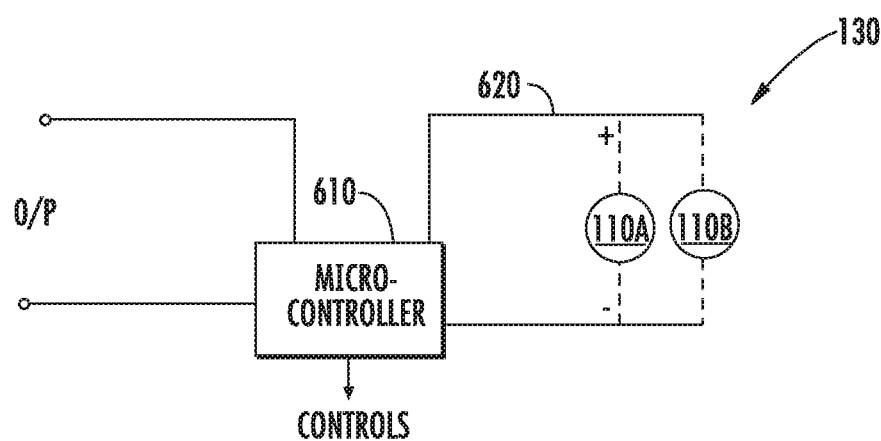
FIG. 6 depicts an example output control circuit according to example embodiments of the present disclosure.

Referring now to FIG. 6, an OCC 130 according to example aspects of the present disclosure is depicted. The OCC 130 can include a microcontroller 610 configured to control an output voltage, current, or power provided to one or more light sources 110. The microcontroller 610 can be microcontroller, control device, microprocessor and one or more memory devices, one or more logic devices, one or more application specific integrated circuits, a control interface, a control system, or other suitable device or circuit that can be provide control functionality according to aspects of the present disclosure. As shown, an OCC 130 can include a microcontroller 610 configured to control the voltage, current, or power provided by the output terminals of an output 124 from the battery pack 120 ("O/P"). The output 124 can be, for example, an output from the energy storage medium of a battery pack 120, such as in a configuration in which the OCC 130 is integrated into the battery pack 120, or it can be an output from an Ethernet cable 115 connected to the output 124 of the battery pack 120, such as in a stand-alone OCC 130 configuration or a configuration in which the OCC 130 is integrated into a light source 110.

In an embodiment, the microcontroller 610 can be configured to control an output voltage provided to one or more light sources 110. For example, the microcontroller 610 can include a power converter to convert power provided by the battery pack 120 from a first DC voltage to a second DC voltage. Further, the microcontroller 610 can be configured to vary an output voltage provided to a common power rail 620. One or more light sources 110 can be connected in parallel to the power rail 620. In an embodiment, a light source 110 connected to the power rail 620 can be connected in series with a current limiting device (not shown), in order to limit a current provided to the light source 110.

In an embodiment, the microcontroller 610 can also be configured to control an output current provided to one or more light sources 110. For example, the microcontroller 610 can be configured to vary an output current provided to a power rail 620. In an embodiment, a light source 110 connected to the power rail 620 can be connected in series with a current limiting device (not shown), in order to limit a current provided to the light source 110. The microcontroller 610 can further be configured to control a power provided to one or more light sources 110 by controlling a voltage and/or current level provided to the light sources 110.

The microcontroller 610 can further be configured to receive one or more inputs from controls 640. Controls 640 can be, for example, a feedback circuit configured to determine a load power consumption requirement, a local control, such as a sensor or a switch, or a control system operating on a computing device 170.

Figure 7:
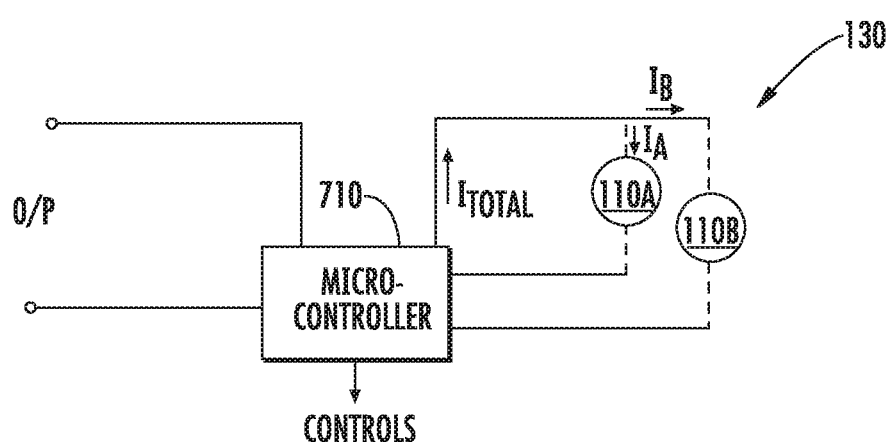
FIG. 7 depicts an example output control circuit according to example embodiments of the present disclosure.

Referring now to FIG. 7, an OCC 130 according to according to example aspects of the present disclosure is depicted. Similar to the OCC 130 depicted in FIG. 6, the OCC 130 in FIG. 7 can include a microcontroller 710 configured to control an output voltage, current, or power provided to one or more light sources 110. The microcontroller 710, however, can be a configured as a current splitter to split an output current provided to one or more light sources 110. For example, a first light source 110A can be a LED array for normal lighting operation, and a second light source 110B can be a LED array for an emergency light source. The microcontroller 710 can be configured to split an output current ($I_{TOTAL}$) from the battery pack 120 or microcontroller 710 into a first current ($I_A$) for powering the first light source 110A and a second current ($I_B$) for powering the second light source 110B. In this way, the microcontroller 710 can be used to adjust the lumen output of the first light source 110A relative to the lumen output of the second light source 110B. Further, the microcontroller can be configured to control delivery of power to the first light source 110A independently of the second light source 110B. For example, the microcontroller 710 can be configured to dim a first light source 110A to provide a low-lumen base light to provide at least a minimum amount of background lighting, while also turning on a second light source 110B to provide a high-lumen and high visibility emergency egress pathway lighting to direct occupants of a building towards an exit. In an embodiment, a light source 110 connected to the microcontroller 710 can be connected in series with a current limiting device (not shown) in order to limit a current provided to the light source 110. Additionally, the microcontroller 710 can include one or more switches to turn an individual light source 110 to an on or off state. For example, a first switch can be closed to allow a first current to be provided to a first light source 110A, while a second switch can be opened to stop a current from flowing to a second light source 110B. In this way, the microcontroller 710 can be configured to independently provide power to one or more light sources 110.

The microcontroller 710 can further be configured to receive one or more inputs from controls 740. Controls 740 can be, for example, a feedback circuit configured to determine a load power consumption requirement, a local control, such as a sensor or a switch, or a control system operating on a computing device 170.

Figure 8:
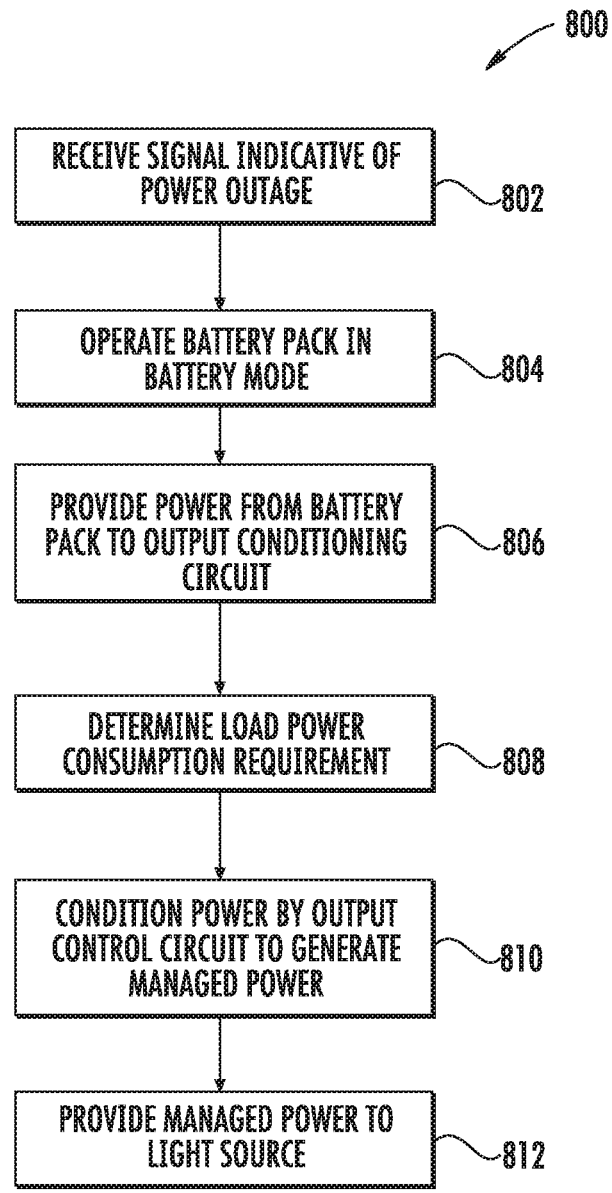
FIG. 8 depicts an example method according to example embodiments of the present disclosure.

Referring now to FIG. 8, an example method (800) according to example aspects of the present disclosure is depicted. The example method (800) can be performed by, for example, a battery pack 120, an OCC 130, a light source 110, and other components in a lighting system 100. The light source 110 can be configured to receive power over one or more Ethernet cables 115.

At (802), the method (800) can include receiving a signal indicative of a power outage. For example, a battery pack 120 can be connected to a PSE 140 by an Ethernet cable 115 configured to provide power to the battery pack 120 from the PSE 140. A power detection circuit in the battery pack 120 can be configured to receive a signal indicative of a power outage by, for example, detecting that the flow of power over the Ethernet cable 115 has stopped. For example, a power detection circuit can be configured to detect a zero voltage or a zero current, determine that an upstream power flow has stopped, and further, that therefore a power outage has occurred.

At (804), the method (800) can include operating a battery pack in a battery mode. For example, a power detection circuit in a battery pack 120 can be configured to control a battery pack 120 to operate in a battery mode to provide power to one or more downstream light sources 110. For example, the power detection circuit can configure an energy storage medium in the battery pack to switch from a recharge mode to a discharge mode to allow for power stored in the energy storage medium to be provided to one or more downstream light sources 110.

At (806), the method (800) can include providing power from the battery pack to an output conditioning circuit. For example, an OCC 130 can be integrated in a battery pack 120, or it can be located downstream of a battery pack 120, such as in a stand-alone OCC 130 configuration or in a configuration in which an OCC 130 is integrated into a light source 110. Power from the energy storage device of the battery pack 120 can be provided to the OCC 130, such as by connecting the OCC 130 to the terminals of an energy storage medium or by providing power over one or more Ethernet cables 115.

At (808), the method (800) can include determining a load power consumption requirement. For example, a feedback circuit in an OCC 130 can be configured to determine a load power consumption requirement for one or more downstream light sources 110. The feedback circuit can be configured to receive one or more current or voltage measurements, or the feedback circuit can be programmed or configured to access one or more databases with the load power consumption requirements or ranges thereof for one or more downstream light sources 110. Based on the load power consumption requirements of the one or more downstream light sources 110, the feedback circuit can be configured to determine a total load power consumption requirement or range thereof.

At (810), the method (800) can include conditioning power from a battery pack by an output control circuit to generate a managed power. For example, an OCC 130 can be a voltage control circuit configured to control an output voltage, a current control circuit configured to control an output current, or a microcontroller configured to control an output voltage, current, or power provided to one or more light sources 110. In an embodiment, the OCC 130 can include a feedback circuit configured to control a power delivered by the battery pack 120 based at least in part on a load power consumption requirement. For example, an OCC 130 can manage delivery of power to one or more light sources 110 such that the operational life of a battery pack 120 exceeds a threshold time period. The OCC 130 can determine a total load power consumption requirement for all downstream light sources 110, and can adjust the power provided by the battery pack 120, such as by adjusting an output current or voltage provided by the battery pack 120, to adjust the operational life of the battery pack 120. Further, an OCC 130 can be configured to deliver power to one or more light sources when power is not being provided by a PSE 140 or PD 150. Further, an OCC 130 can manage delivery of power from a battery pack 120 such that the battery pack 120 is configured to deliver power to one or more light sources to provide egress lighting for a threshold time period. In this way, an OCC 130 can condition a power from a battery pack 120 to generate a managed power.

At (812), the method (800) can include providing the managed power to the light source. For example, an OCC 130 can be integrated into a battery pack 120 or can be a stand-alone OCC 130. One or more Ethernet cables 115 can be coupled to the OCC 130 and a light source 110. The one or more Ethernet cables 115 can deliver the managed power from the OCC 130 to the light source 110. Additionally, an OCC 130 can be integrated into a light source 110. The light source 110 can be connected to a battery pack 120 by one or more Ethernet cables 115. Power from the battery pack 120 can be delivered to the light source 110, wherein an OCC 130 can condition the power from the battery pack 120 to generate a manage power, which can then be provided to the light source 110. In this way, the managed power can be provided to a light source 110.

Example lighting systems, battery packs, OCCs, and methods for providing and managing emergency power to light sources are disclosed in FIGS. 1-8 for purposes of illustration and discussion. Those of ordinary skill in the art, using the disclosures provided herein, will understand that other lighting systems, devices, and methods can be used in a variety of different manners without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:
1. A lighting system, comprising:
one or more light sources configured to receive power over one or more Ethernet cables;
a battery pack comprising an energy storage medium, the battery pack configured to provide power to the one or more light sources over the one or more Ethernet cables; and an output control circuit coupled between the battery pack and the one or more light sources via the one or more Ethernet cables, the output control circuit including a feedback circuit, the output control circuit configured to manage delivery of power from the battery pack to the one or more light sources, wherein the battery pack is coupled between the output control circuit and a Power over Ethernet (PoE) switch, wherein the feedback circuit is configured to determine a load power consumption requirement for the one or more light sources, wherein the output control circuit is configured to control power delivered by the battery pack based at least in part on the load power consumption requirement so that the operational life of the battery pack can exceed a minimum threshold time period during a power outage condition, and wherein the output control circuit is configured to decrease the power to a first light of the one or more light sources during the power outage condition and increase the power to a second light of the one or more light sources during the power outage condition.

2. The lighting system of claim 1, wherein the output control circuit comprises a voltage control circuit configured to control an output voltage of power provided to the light source; wherein the voltage control circuit comprises:
   a first selectable resistor and a second selectable resistor connected in series; and
   wherein the output voltage for the voltage control circuit comprises a voltage across the second selectable resistor.

3. The lighting system of claim 1, wherein the output control circuit comprises a current control circuit configured to control an output current provided to the light source.

4. The lighting system of claim 3, wherein the current control circuit comprises a constant current regulator configured to provide a controlled current to the light source or a selectable resistor configured to provide a controlled current to the light source and the feedback circuit is configured to determine the load power consumption requirement by,
   receiving one or more current or voltage measurements of downstream loads,
   accessing one or more databases with the load power consumption requirements or ranges thereof for the one or more downstream load, and
   determining a total load power consumption requirement based on the load power consumption requirements of the one or more downstream loads.

5. The lighting system of claim 1, wherein the output control circuit comprises a microcontroller configured to control delivery of power to the light source; and
   wherein the microcontroller is configured to control delivery of power to the first light source independently of the second light source.

6. The lighting system of claim 1, wherein the second light comprises an emergency light source.

7. The lighting system of claim 1, wherein the battery pack is configured to provide power to the one or more light sources to provide egress lighting for the threshold time period.

8. The lighting system of claim 1, wherein the battery pack is further configured to receive power via a first Ethernet cable, wherein the battery pack further comprises a power detection circuit configured to determine whether power is being provided over the first Ethernet cable.

9. The lighting system of claim 1, further comprising:
   a powered device configured to provide power to one or more light sources, wherein the powered device is further configured to receive one or more control signals from a local control device.

10. A method for providing backup power from a battery pack apparatus to a first light source and a second light source, the light sources configured to receive power over one or more Ethernet cables, the method, comprising:
    receiving, at an input of a battery pack apparatus coupled to a Power over Ethernet (PoE) switch via a first Ethernet cable, one or more signals indicative of a power outage;
    responsive to receiving the one or more signals indicative of the power outage, conditioning, via an output control circuit coupled to an output of the battery pack apparatus via a second Ethernet cable, power from an energy storage medium of the battery pack apparatus to generate a managed power;
    determining, a load power consumption requirement by a feedback circuit;
    providing, via the output control circuit the managed power to the light sources over one or more Ethernet cables coupled to the output control circuit and the light source, wherein the managed power decreases power provided to the first light source and increases power to the second light source; and
    controlling, via the output control circuit, an amount of power delivered from the energy storage medium to the light sources based at least in part on the load power consumption requirement so that the operational life of the battery pack can exceed a minimum threshold time period during a power outage condition.

11. A lighting system, comprising:
    a first light source and a second light source configured to receive power over one or more Ethernet cables;
    a battery pack comprising an energy storage medium, the battery pack configured to provide power to the first and second light sources over the one or more Ethernet cables; and
    an output control circuit coupled between the battery pack and the first and second light sources via the one or more Ethernet cables, the output control circuit including a feedback circuit, the output control circuit configured to manage delivery of power from the battery pack to the first and second light sources, and
    a Power over Ethernet (PoE) switch providing power to the battery pack,
    wherein the feedback circuit is configured to determine a load power consumption requirement for the first and second light sources and to control power delivered by the battery pack based at least in part on the load power consumption requirement so that the operational life of the battery pack can exceed a minimum threshold time period during a power outage condition and to decrease the power provided to the first light source and increase power provided to the second light source.

12. The lighting system of claim 11, wherein the output control circuit comprises a voltage control circuit configured to control an output voltage of power provided to the first and second light source; wherein the voltage control circuit comprises:
    a first selectable resistor and a second selectable resistor connected in series; and
    wherein the output voltage for the voltage control circuit comprises a voltage across the second selectable resistor.

13. The lighting system of claim 11, wherein the output control circuit comprises a current control circuit configured to control an output current provided to the first and second light source.

14. The lighting system of claim 13, wherein the current control circuit comprises a constant current regulator configured to provide a controlled current to the first and second light source or a selectable resistor configured to provide a controlled current to the first and second light source.

15. The lighting system of claim 11, wherein the output control circuit comprises a microcontroller configured to control delivery of power to the first and second light source; and wherein the microcontroller is configured to control delivery of power to the first light source independently of the second light source.

16. The lighting system of claim 11, wherein at least one of the light sources comprises an emergency light source.

17. The lighting system of claim 11, wherein the battery pack is configured to provide power to the first and second light sources to provide egress lighting.

18. The lighting system of claim 11, wherein the battery pack is further configured to receive power via a first Ethernet cable, wherein the battery pack further comprises a power detection circuit configured to determine whether power is being provided over the first Ethernet cable.

19. The lighting system of claim 11, further comprising:
a powered device configured to provide power to at least one of the light sources, wherein the powered device is further configured to receive one or more control signals from a local control device.

20. The lighting system of claim 11, wherein the battery pack is coupled between the output control circuit and the Power over Ethernet (PoE) switch.

* * * * *